(12) United States Patent
Kim

(10) Patent No.: US 7,091,903 B2
(45) Date of Patent: Aug. 15, 2006

(54) APPARATUS AND METHOD FOR PROCESSING SIGNAL OF TELEMATICS TERMINAL

(75) Inventor: Hyong-Kyun Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 11/030,197

(22) Filed: Jan. 7, 2005

(65) Prior Publication Data

US 2005/0151682 A1    Jul. 14, 2005

(30) Foreign Application Priority Data

Jan. 9, 2004    (KR) ...................... 10-2004-0001595

(51) Int. Cl.
*H04B 7/185* (2006.01)
(52) U.S. Cl. ........................... 342/357.01; 342/357.06; 701/213
(58) Field of Classification Search ........... 342/357.01, 342/357.06, 357.12, 374; 701/207, 213
See application file for complete search history.

(56) References Cited

U.S. PATENT DOCUMENTS

| | | | |
|---|---|---|---|
| 5,355,140 A * | 10/1994 | Slavin et al. ................ 342/386 |
| 5,982,322 A * | 11/1999 | Bickley et al. ........ 342/357.08 |
| 6,125,326 A | 9/2000 | Ohmura et al. |
| 6,222,484 B1 * | 4/2001 | Seiple et al. ........... 342/357.09 |
| 6,275,164 B1 * | 8/2001 | MacConnell et al. ....... 340/692 |
| 6,298,229 B1 * | 10/2001 | Tomlinson et al. ...... 455/404.2 |
| 6,377,165 B1 | 4/2002 | Yoshioka et al. |
| 6,608,553 B1 * | 8/2003 | Isobe ...................... 340/426.1 |
| 6,963,292 B1 * | 11/2005 | White ........................ 340/963 |
| 2002/0021244 A1 | 2/2002 | Aizawa et al. |
| 2004/0198312 A1 * | 10/2004 | Jarett ..................... 455/404.1 |

FOREIGN PATENT DOCUMENTS

EP        1184642 A1    3/2002
KR        00202256 B1   3/1999

* cited by examiner

*Primary Examiner*—Dao Phan
(74) *Attorney, Agent, or Firm*—Birch, Stewart, Kolasch & Birch, LLP

(57) ABSTRACT

Apparatus and method for implementing an autonomous GPS function and an emergency signal transmitting function is described. In one embodiment, the apparatus includes a switching unit for changing a connection path of a GPS signal received through an antenna when a request to transmit an emergency signal is made. The first converting unit receives the GPS signal and calculates position information based on the GPS signal. In another embodiment, the switching unit changes a connection path of the position information calculated by a GPS signal processing unit when the request to transmit the emergency signal is made. A mobile communications modem receives the position information and transmits same to a base station. The mobile communication modem also controls the changing of the connection path of the switching unit when the request to transmit the emergency signal is made. Accordingly, load on a control unit can be decreased.

22 Claims, 4 Drawing Sheets

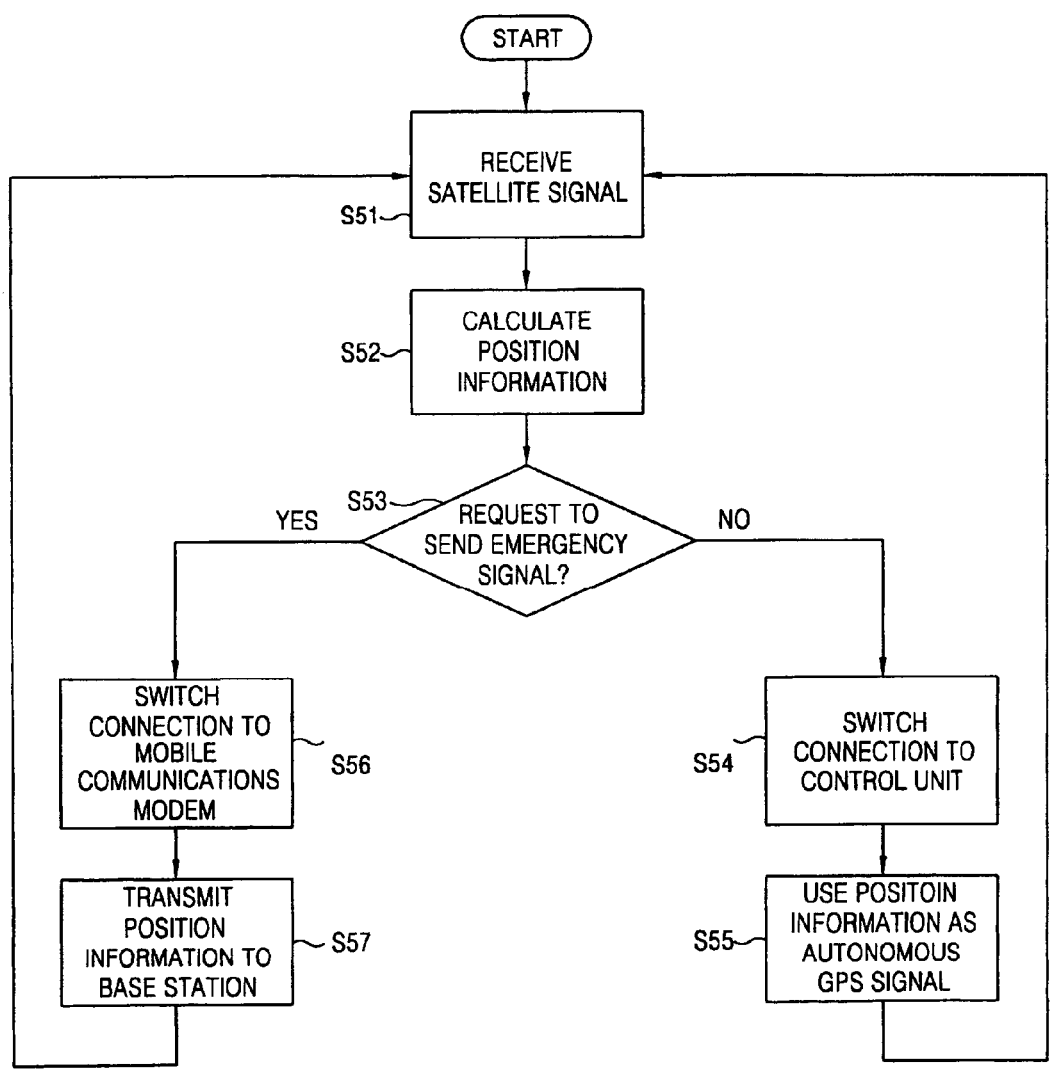

APPARATUS AND METHOD FOR PROCESSING SIGNAL OF TELEMATICS TERMINAL

This non-provisional application claims priority under 35 U.S.C. §119(a) on patent application No. 10-2004-0001595 filed in Korea on Jan. 9, 2004, the entire contents of which are hereby incorporated by reference.

BACKGROUND OF THE INVENTION

1. Field of the Invention

The present invention relates to telematics, and particularly, to an apparatus and method for processing a signal of a telematics terminal capable of processing autonomous GPS signals and requests to transmit emergency signals.

2. Description of the Related Art

"Telematics", a compound word formed from the words "telecommunications" and "informatics", is receiving much attention in the field of information technology (IT). Telematics generally refer to technologies that integrate wireless services, such as voice and data, with GPS to provide a vast array of information to drivers, pilots, and the like, while the vehicle (car, plane, ship, etc.) is moving. Telematics can also include information regarding safety. In particular, telematics can allow a computer provided in a car, an airplane, a ship or the like, to exchange information with a base station by using radio communication techniques, GPS (global positioning system), technologies for converting specific information into a text signal or a voice signal via the Internet, and other related technologies.

For example, a telematics service for a car can provide a driver with traffic-management information that can assist the driver to avoid traffic delays and road obstacles, safety related information such as theft detection, entertainment information such as games, or the like. The information may be provided in real-time by employing mobile communication and position detecting technologies.

In addition, in conjunction with GPS systems of the vehicle, a telematics terminal can provide an autonomous GPS signal receiving function for automobile navigation. The telematics terminal can further provide an emergency signal transmitting function (E911 function) for transmitting a current position of the telematics terminal via a connection with an emergency call center when an emergency situation arises.

FIG. 1 is a block diagram illustrating a structure of an apparatus for processing a signal of a telematics terminal according to a related art. In the related art apparatus, the telematics terminal includes a GPS signal receiving function and an emergency signal transmitting function.

As shown, the telematics terminal includes a GPS antenna 101, a GPS signal processing unit 102, a control unit 103, a mobile communications antenna 104, an RF transceiver 105, a mobile communications modem 106, the first converting unit 107, and the second converting unit 108.

The GPS antenna 101 receives GPS signals. The GPS signal processing unit 102 down-converts the GPS signals received by the GPS antenna 101 and calculates a current position of the telematics terminal based on the down-converted GPS signals. The control unit 103 communicates with the mobile communications modem 106 and provides the modem 106 with the position information calculated by the GPS signal processing unit 102.

The mobile communications antenna 104 allows for CDMA, PCS, analog, or other wireless communications to take place with a base station (not shown). When receiving messages from the base station, the RF transceiver 105 receives RF signals from the base station via the mobile communication antenna 104 and supplies the same to the first converting unit 107. The first converting unit 107 down-converts the RF signals and provides the down-converted RF signals to the mobile communications modem 106.

When transmitting messages to the base station, the second converting unit 108 up-converts baseband signals received from the mobile communications modem 106 into converted RF signals and provides the same to the RF transceiver 105. The RF transceiver 105 transmits the converted RF signals to the base station via the mobile communication antenna 104.

The mobile communications modem 106 processes various calls and signals transmitted to and received from the base station. The mobile communications modem 106 also communicates with the control unit 103 to request the position information of the telematics terminal. As noted above, in response to the request, the control unit 103 provides the position information of the telemetics terminal to the mobile communications modem 106.

In the related art of FIG. 1, the RF transceiver 105 includes a duplexer and a bandpass filter for transmitting and receiving the RF signals.

It should be noted that the mobile communications modem 106 is also referred to as a network access driver (NAD) processor 106 or a mobile station modem (MSM) 106. In the related art, the mobile communications modem 106 for mobile communications does not include an emergency signal transmitting capability.

The operation of processing a signal of the related art telematics terminal, constructed as described above, follows.

The mobile communications modem 106 may receive a request to transmit an emergency signal. For example, the request may originate from a user (driver) or from a base station. When the request is received, the mobile communications modem 106 requests the position information from the control unit 103. In response to the request, the control unit 103 passes on the position information calculated by the GPS signal processing unit 102 to the mobile communications modem 106. The mobile communications modem 106 in turn transmits the position information received from the control unit 103 to the base station (via the second converting unit 108, the RF transceiver 105, and the mobile communication antenna 104).

As noted above, the mobile communications modem 106 of the related art includes no emergency transmitting capability. When the mobile communications modem 106 receives the request to transmit the emergency signal, the mobile communications modem 106 must request and receive the position information from the control unit 103.

However, the control unit 103 constantly receives and processes the updated position information from the GPS signal processing unit 102. In other words, the control unit 103 constantly implements the autonomous GPS reception method that always receives GPS signals to maintain accurate position information in real time, and provides the real-time position information to a navigation system of the vehicle. In addition, the control unit 103 also processes the request to transmit the emergency signal, which is requested by the mobile communications modem 106.

As described above, the related art apparatus for processing a signal of the telematics terminal can process an autonomous GPS signal and a request to transmit the emergency signal. However, because the control unit 103 processes both the autonomous GPS signal and the request to transmit the emergency signal, load on the control unit 103 is undesirably high.

SUMMARY OF THE INVENTION

Therefore, an object of the present invention is to provide an apparatus and method for processing a signal of a telematics terminal capable of directing a GPS signal to a proper reception to perform an autonomous GPS function or to respond to a request to transmit an emergency signal using a single GPS antenna.

To achieve these and other advantages and in accordance with a purpose of the present invention, as embodied and broadly described herein, an apparatus for processing a signal of a telematics terminal includes: a global positioning system (GPS) functioning unit for providing an autonomous GPS function by calculating position information based on the signal; a radio frequency (RF) functioning unit for calculating position information based on the signal and for transmitting the calculated position information to a base station when a request to transmit an emergency signal is received; and a switching unit for selectively providing the signal received through the antenna to the GPS functioning unit during normal operation or to the RF functioning unit when the request to transmit the emergency signal is received.

Another apparatus for processing a signal of a telematics terminal according to an embodiment of the present invention includes: a switching unit for selecting a path of the signal; a first converting unit for calculating position information based on the signal provided through the switching unit when a request to transmit an emergency signal is received; and a mobile communications modem for receiving the position information from the first converting unit, transmitting the received position information to a base station, and controlling the selection of the path within the switching unit to supply the first converting unit with the signal when the request to transmit the emergency signal is received.

Further, a method for processing a signal of a telematics terminal according to an embodiment of the present invention includes directing the signal to the first converting unit when a request to transmit an emergency signal is received; calculating position information based on the signal utilizing the first converting unit when the request to transmit the emergency signal is received; and transmitting the position information to a base station when the request to transmit the emergency signal is received.

Yet further, an apparatus for processing a signal of a telematics terminal includes a GPS signal processing unit for calculating position information based on the signal; a switching unit for selecting a path of the position information when a request to transmit the emergency signal is received; and a mobile communications modem for receiving the position information from the GPS signal processing unit, transmitting the position information to a base station, and controlling the selection of the path within the switching unit to supply the position information to the mobile communications modem when the request to transmit the emergency signal is received.

Yet further, a method for processing a signal of a telematics terminal according to an embodiment of the present invention includes calculating position information based on the signal; directing the position information to a mobile communications modem when a request to transmit an emergency signal is received; and transmitting the position information to a base station utilizing the mobile communications modem when the request to transmit the emergency signal is received.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings:

FIG. 5 is another flow chart illustrating a method for processing a signal of a telematics terminal in accordance with an embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
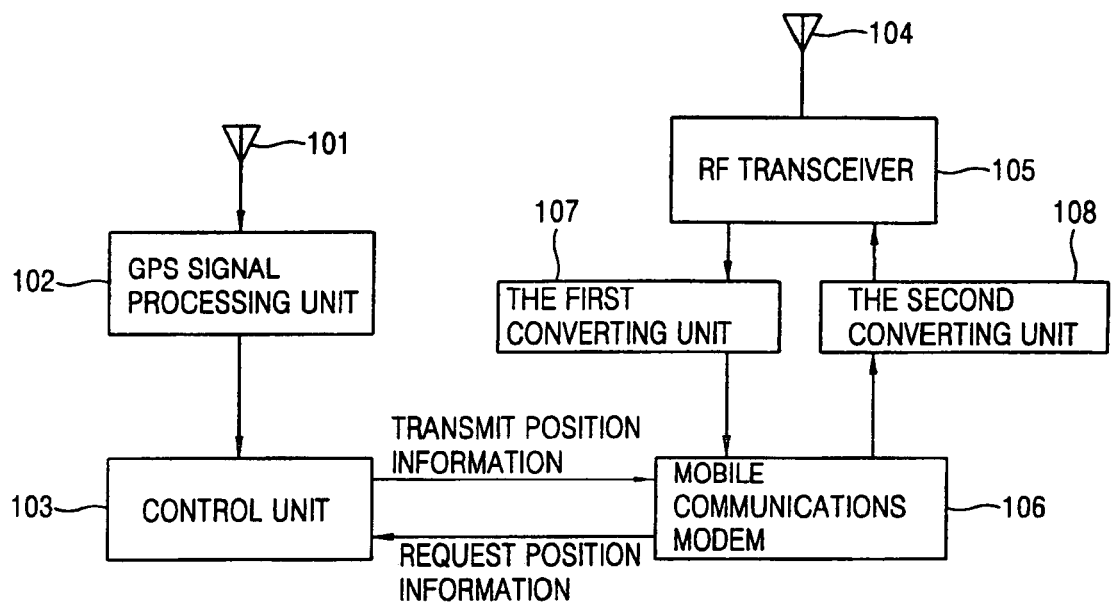
FIG. 1 is a block diagram illustrating a structure of an apparatus for processing a signal of a telematics terminal in accordance with a related art.
Figure 2:
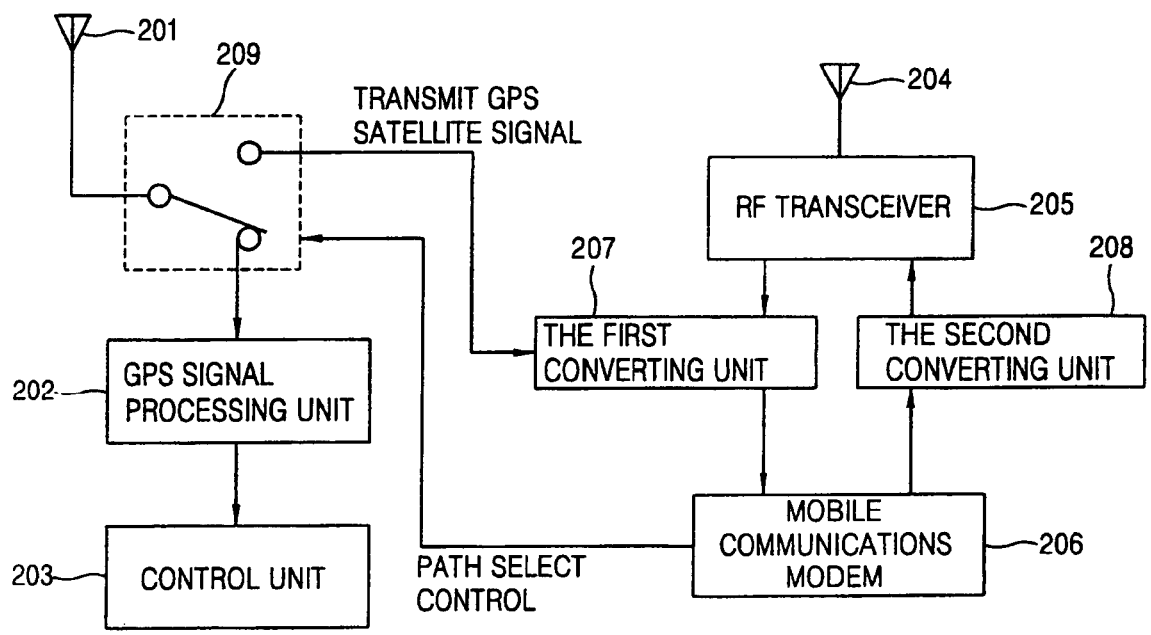
FIG. 2 is a block diagram illustrating a structure of an apparatus for processing a signal of a telematics terminal in accordance with an embodiment of the present invention.

FIG. 2 is a block diagram illustrating a structure of an apparatus for processing a signal of a telematics terminal in accordance with an embodiment of the present invention.

As shown, the signal processing apparatus according to an embodiment of the present invention may include a GPS antenna 201, a GPS signal processing unit 202, a control unit 203, a mobile communications antenna 204, an RF transceiver 205, a mobile communications modem 206, a first converting unit 207, a second converting unit 208, and a switching unit 209.

Components of the embodiment may perform similar functions as the similar components of the related art. For example, The GPS antenna 201 may receive GPS signals; the GPS signal processing unit 202 may convert the GPS signals received by the GPS antenna 201 and calculate a current position of the telematics terminal based on the converted GPS signals; the mobile communications antenna 204 may allow for CDMA, PCS, analog, or other wireless communications to take place with a base station (not shown); the RF transceiver 205 may receive RF signals from the base station via the mobile communication antenna 204 and supply the same to the first converting unit 207 (on the receiving side) and may transmit converted RF signals to the base station via the mobile communication antenna 204 (on the transmitting side); the first converting unit 207 may down-convert the RF signals from the RF transceiver 205 and provide the down-converted RF signals to the mobile communications modem 206; and the second converting unit 208 may up-convert baseband signals received from the mobile communications modem 206 into up-converted RF signals and provides the same to the RF transceiver 205 to be transmitted. The communications modem 206 for can be a NAD processor or a MSM.

This embodiment differs from the related art in certain respects. This embodiment includes the switching unit 209 as noted above. The switching unit 209 may perform a switching function to selectively direct the GPS signals to any of multiple paths. A switch adopting a single pole double throw (SPDT) method may be used. In this embodiment, the switching unit 209 may selectively direct the signals to one of two connection paths—to the GPS signal processing unit 202 or to the first converting unit 207. The selection of a particular connection path may be based on a control signal from the communications modem 206.

In addition to down-converting the RF signals provided from the RF transceiver 205, the first converting unit 207 may also down-convert the GPS signals received by the GPS antenna 201 (via the switching unit 209) and calculate the current position of the telematics terminal based on the down-converted GPS signals. In other words, the first converting unit 207 may include capabilities similar to that of the GPS signal processing unit 202. The first converting unit 207 may be provided with a GPS signal receiver. Further, the communications modem 206 of the embodiment may include a capability to perform an emergency signal transmit function.

Accordingly, when a request to transmit the emergency signal is received (from the user or from the base station), the communications modem 206 need not send a request to the control unit 203 for the current position information. Instead, the communications modem 206 may instruct the switching unit 209 to direct the GPS signals to the first converting unit 207. The first conveting unit 207 may then calculate the current position based on the GPS signals and provide the position information to the mobile communications modem 206. The mobile communications modem 206 may then transmit the emergency signal to the base station along with the position information. In this manner, the high load on the control unit 203 may be avoided or minimized.

During normal operation, the GPS signal received through the GPS antenna 201 may be directed to the GPS processing unit 202 via the switching unit 209. The GPS signal processing unit 202 may calculate the position information and provide the same to the control unit 203. The control unit 203 may utilize the position information as an autonomous GPS signal for the navigation system of the vehicle.

However, when the request to transmit the emergency signal is received, the GPS signal received through the GPS antenna 201 may be directed to the first converting unit 207. The first converting unit 207 may calculate the position information and provide the same to the mobile communications modem 206. The mobile communications modem 206, may then transmit the emergency signal along with the position information.

Figure 3:
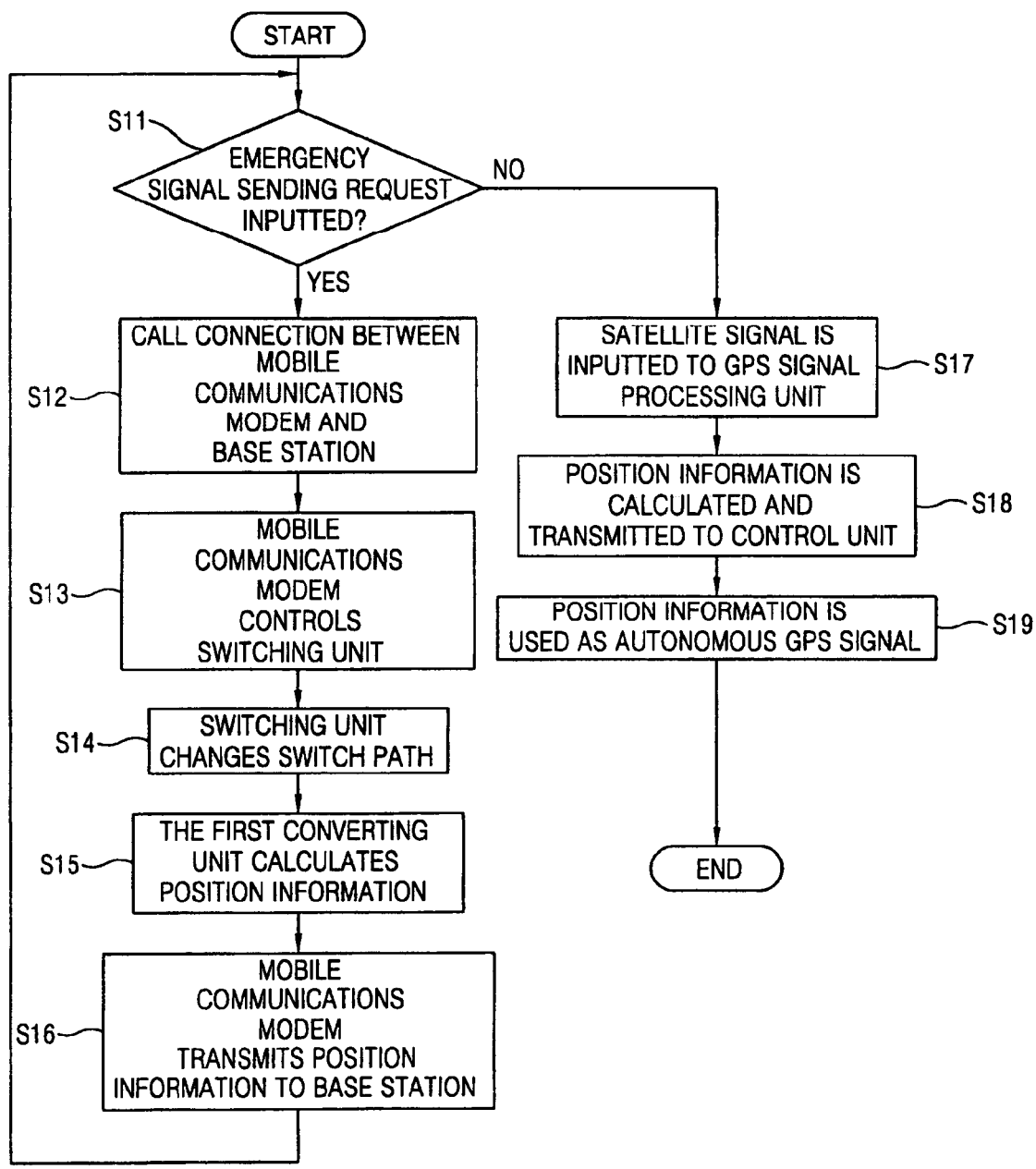
FIG. 3 is a flow chart illustrating a method for processing a signal of a telematics terminal in accordance with an embodiment of the present invention.

FIG. 3 is a flow chart illustrating a method for processing a signal of a telematics terminal in accordance with an embodiment of the present invention. The operation of the apparatus for processing a signal of the telematics terminal will now be described in detail with reference to the drawing.

First, it may be determined whether a request to transmit an emergency signal is received from a user or from a base station (S11). If the request to transmit the emergency signal is received, the mobile communications modem 206 may establish a connection with the base station via the first converting unit 207, the second converting unit 208, the RF transceiver 205, and the mobile communication antenna 204 (S12). The mobile communications modem 206 may direct the switching unit 209 to provide a path from the GPS antenna 201 to the first converting unit 207 (S13) to which the switching unit 209 may respond accordingly (S14).

The first converting unit 207 may process the GPS signal received by the GPS antenna 201 to calculate the position information (S15). The mobile communications modem 206 may receive the position information from the first converting unit 207 and transmit the same to the base station via the second converting unit 208, the RF transceiver 205, and the mobile communications antenna 204 (S16).

If the request to transmit the emergency signal is not received, the switching unit 209 may provide a connection between the GPS antenna 201 to the GPS signal processing unit 202 to thereby supply the GPS signal to the GPS signal processing unit 202 (S17). The GPS signal processing unit 202 may calculate the current position from the GPS signal and provide the calculated position information to the control unit 203 (S18). The control unit 203 may use the position information as an autonomous GPS signal required for the navigation system of the vehicle(S19).

Thus, during normal operation, the switching unit 209 may normally connect the GPS antenna 201 with the GPS signal processing unit 202 to calculate the current position and the position information may be used by the control unit 203.

On the other hand, when the request to transmit an emergency signal is received, the path of the switching unit 209 may temporarily connect the GPS antenna 201 with the first converting unit 207 so that the second converting unit 207 may calculate the current position and the position information may be used by the mobile communications modem 206.

Figure 4:
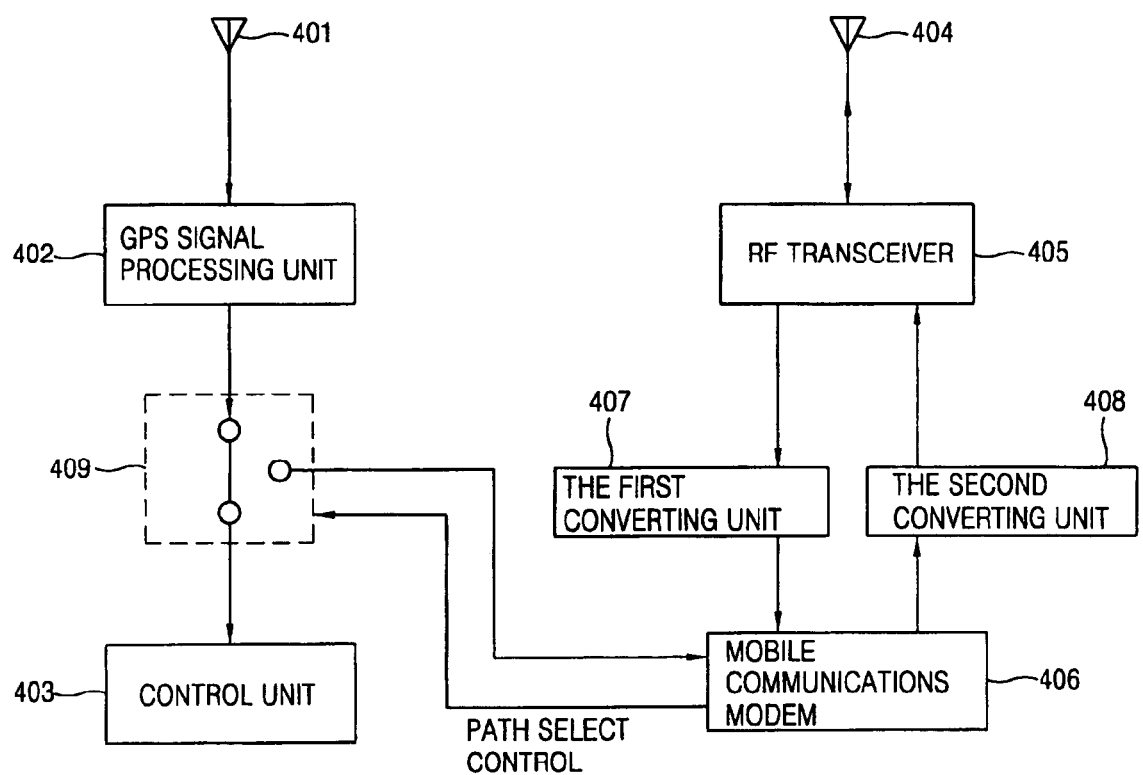
FIG. 4 is another block diagram illustrating a structure of an apparatus for processing a signal of a telematics terminal in accordance with an embodiment of the present invention.

FIG. 4 is a block diagram illustrating a structure of an apparatus for processing a signal of a telematics terminal in accordance with another embodiment of the present invention. As shown, the signal processing apparatus may include a GPS antenna 401, a GPS signal processing unit 402, a control unit 403, a mobile communications antenna 404, an RF transceiver 405, a mobile communications modem 406, a first converting unit 407, a second converting unit 408, and a switching unit 409.

Components of the embodiment may perform similar functions as the similar components of the embodiment of FIG. 2. For example, The GPS antenna 401 may receive GPS signals; the GPS signal processing unit 402 may convert the GPS signals received by the GPS antenna 401 and calculate a current position of the telematics terminal based on the converted GPS signals; the mobile communications antenna 404 may allow for CDMA, PCS, analog, or other wireless communications to take place with a base station (not shown); the RF transceiver 405 may receive RF signals from the base station via the mobile communication antenna 404 and supply the same to the first converting unit 407 (on the receiving side) and may transmit converted RF signals to the base station via the mobile communication antenna 404 (on the transmitting side); the first converting unit 407 may down-convert the RF signals from the RF transceiver 405 and provide the down-converted RF signals to the mobile communications modem 406; and the second converting unit 408 may up-convert baseband signals received from the mobile communications modem 406 into up-converted RF signals and provides the same to the RF transceiver 405 to be transmitted. The communications modem 406 for can be a NAD processor or a MSM.

Like the embodiment illustrated in FIG. 2, this embodiment also includes a switching unit 409. However, unlike the switching unit 209 of FIG. 2, the switching unit 409 of this embodiment may perform a switching function to selectively direct the calculated current position information signal calculated by the GPS signal processing unit 402 to any of multiple paths. A switch adopting a single pole double throw (SPDT) method may be used.

In this embodiment, the switching unit 409 may selectively direct the signals to one of two connection paths—to the control unit 403 or to the mobile communications modem 406. The selection of a particular connection path may be based on a control signal from the mobile communications modem 406.

Thus, the apparatus of FIG. 4 provides an advantage over the apparatus of FIG. 2 in that the first converting unit 407 need not be capable of down-converting the GPS signals. The first converting unit 407 may be provided with a GPS signal receiver or may not be provided with the GPS signal receiver. The mobile communications modem 406 of this embodiment may include a capability to perform an emergency signal transmit function.

Accordingly, when a request to transmit the emergency signal is received (from the user or from the base station), the communications modem 406 need not send a request to the control unit 403 for the current position information. Instead, the mobile communications modem 406 may receive the calculated position information from the GPS signal processing unit 402 via the switching unit 409. The mobile communications modem 406 may then transmit the emergency signal to the base station along with the position information. In this manner, the high load on the control unit 403 may be avoided or minimized.

During normal operation, the GPS signal processing unit 402 may calculate the position information based on the GPS signal received through the GPS antenna 401 and provide the position information to the control unit 403 via the switching unit 409. The control unit 403 may utilize the position information as an autonomous GPS signal for the navigation system of the vehicle.

However, when the request to transmit the emergency signal is received, the position information calculated by the GPS signal processing unit 402 may be directed to the mobile communications modem 406 via the switching unit 409. The mobile communications modem 406, may then transmit the emergency signal along with the position information to the base station.

FIG. 5 is a flow chart illustrating a method for processing a signal of a telematics terminal in accordance with an embodiment of the present invention. For example, the apparatus as illustrated in FIG. 4 may use the following method.

First, the GPS signal may be received (S51) and current position may be calculated (S52) based on the GPS signal by the GPS signal processing unit 402. Then it may be determined whether a request to transmit an emergency signal is received from a user or from a base station (S53) by the mobile communications modem 406.

If the request to transmit the emergency signal is received, the mobile communications modem 406 may establish a connection with the base station via the first converting unit 407, the second converting unit 408, the RF transceiver 405, and the mobile communication antenna 404. The mobile communications modem 406 may direct the switching unit 409 to switch connection from the GPS signal processing unit 402 to the mobile communications modem 406 to which the switching unit 409 may respond accordingly (S56). The communications modem 406 may receive the position information from the GPS signal processing unit 402 (via switching unit 409) and transmit the same to the base station via the second converting unit 408, the RF transceiver 405, and the mobile communications antenna 404 (S57).

If the request to transmit the emergency signal is not received, the switching unit 409 may provide a connection between the GPS signal processing unit 402 to the control unit 403 (S54) to thereby supply the position information to the control unit 403. The control unit 403 may use the position information as an autonomous GPS signal required for the navigation system of the vehicle (S55).

Thus, during normal operation, the switching unit 409 may connect the GPS signal processing unit 402 to the control unit 403. On the other hand, when the request to transmit an emergency signal is received, the path of the switching unit 409 may temporarily connect the GPS signal processing unit 402 to the mobile communications modem 406 such that the current position information may be used by the mobile communications modem 406.

In the above noted embodiments of the apparatuses and methods for processing a signal of the telematics terminal in accordance with the present invention, either the GPS signal received by the GPS antenna or the position information calculated by the GPS signal unit may be directed according to an operation state of the telematics terminal. Thus, both the autonomous GPS function and the emergency signal transmitting function may be performed with one antenna.

In addition, the load on the control unit can be decreased by separating the paths for processing the autonomous GPS function of the telematics terminal and the path for its emergency signal transmitting function.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for processing a signal of a telematics terminal, comprising:
    a global positioning system (GPS) functioning unit for providing an autonomous GPS function by calculating position information based on the signal;
    a radio frequency (RF) functioning unit for calculating position information based on the signal and for transmitting the calculated position information to a base station when a request to transmit an emergency signal is received; and
    a switching unit for selectively providing the signal received through an antenna to the GPS functioning unit during normal operation or to the RF functioning unit when the request to transmit the emergency signal is received.

2. The apparatus of claim 1, wherein the GPS functioning unit comprises:
    a GPS signal processing unit for calculating the position information based on the signal provided through the switching unit; and
    a control unit for providing the position information as information for vehicle navigation.

3. The apparatus of claim 1, wherein the RF functioning unit comprises:
a first converting unit for calculating the position information based on the signal provided through the switching unit; and
a mobile communications modem for controlling a path of the signal within the switching unit and for transmitting the position information received from the first converting unit when the request to transmit the emergency signal is received.

4. The apparatus of claim 3, wherein the first converting unit comprises a GPS signal receiver.

5. The apparatus of claim 1, wherein the switching unit comprises a switch adopting a SPDT (single pole double throw) method in which the signal is provided to one of two output terminals.

6. The apparatus of claim 1, wherein the signal is GPS (Global positioning System) signal.

7. An apparatus for processing a signal of a telematics terminal, comprising:
a switching unit for selecting a path of the signal;
a first converting unit for calculating position information based on the signal provided through the switching unit when a request to transmit an emergency signal is received; and
a mobile communications modem for receiving the position information from the first converting unit, transmitting the received position information to a base station, and controlling the selection of the path within the switching unit to supply the first converting unit with the signal when the request to transmit the emergency signal is received.

8. The apparatus of claim 7, further comprising:
a GPS signal processing unit for calculating position information based on the signal provided through the switching unit when the request to transmit the emergency signal is not received; and
a control unit for implementing an autonomous GPS function based on the position information calculated by the GPS signal processing unit.

9. The apparatus of claim 7, wherein the switching unit comprises a switch adopting a SPDT (single pole double throw) method in which the signal is provided to one of two output terminals.

10. The apparatus of claim 7, wherein the first converting unit comprises a GPS signal receiver for processing the signal.

11. A method for processing a signal of a telematics terminal, comprising:
directing the signal to the a first converting unit when a request to transmit an emergency signal is received;
calculating position information based on the signal utilizing the first converting unit when the request to transmit the emergency signal is received; and
transmitting the position information to a base station when the request to transmit the emergency signal is received.

12. The method of claim 11, wherein the step of directing the signal comprises:
determining whether the request to transmit the emergency signal is received; and
switching a path of a switching unit to provide the signal to the first converting unit when it is determined that the request to transmit the emergency signal is received.

13. The method of claim 11, wherein the step of transmitting the position information to the base station is accomplished by utilizing a mobile communications modem.

14. The method of claim 11, further comprising:
directing the signal to a GPS signal processing unit when the request to transmit the emergency signal is not received;
calculating the position information based on the signal utilizing the GPS signal processing unit; and
utilizing the position information for vehicle navigation.

15. An apparatus for processing a signal of a telematics terminal, comprising:
a GPS signal processing unit for calculating position information based on the signal;
a switching unit for selecting a path of the position information when a request to transmit the emergency signal is received; and
a mobile communications modem for receiving the position information from the GPS signal processing unit, transmitting the position information to a base station, and controlling the selection of the path within the switching unit to supply the position information to the mobile communications modem when the request to transmit the emergency signal is received.

16. The apparatus of claim 15, further comprising:
a control unit for implementing an autonomous GPS function based on the position information calculated by the GPS signal processing unit when the request to transmit the emergency signal is not received.

17. The apparatus of claim 15, wherein the switching unit comprises a switch adopting a SPDT (single pole double throw) method in which the signal is provided to one of two output terminals.

18. A method for processing a signal of a telematics terminal, comprising:
calculating position information based on the signal;
directing the position information to a mobile communications modem when a request to transmit an emergency signal is received; and
transmitting the position information to a base station utilizing the mobile communications modem when the request to transmit the emergency signal is received.

19. The method of claim 18, wherein the step of directing the position information comprises:
determining whether the request to transmit the emergency signal is received; and
switching a path of a switching unit to provide the position information to the mobile communications modem when it is determined that the request to transmit the emergency signal is received.

20. The method of claim 18, further comprising:
directing the position information to a control unit when the request to transmit the emergency signal is not received; and
utilizing the position information for vehicle navigation when the request to transmit the emergency signal is not received.

21. The apparatus of claim 8, wherein the mobile communications modem controls the selection of the path within the switching unit to supply the GPS signal processing unit with the signal when the request to transmit the emergency signal is not received.

22. The apparatus of claim 16, wherein the mobile communications modem controls the selection of the path within the switching unit to supply the position information to the control unit when the request to transmit the emergency signal is not received.

* * * * *